(12) United States Patent
Jung

(10) Patent No.: US 10,909,946 B2
(45) Date of Patent: Feb. 2, 2021

(54) LOW POWER DRIVING METHOD AND ELECTRONIC DEVICE PERFORMING THEREOF

(71) Applicant: Samsung Electronics Co., Ltd., Suwon-si (KR)

(72) Inventor: Byeng Sang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/358,390

(22) Filed: Mar. 19, 2019

(65) Prior Publication Data

US 2019/0213973 A1 Jul. 11, 2019

Related U.S. Application Data

(63) Continuation of application No. 14/627,941, filed on Feb. 20, 2015, now Pat. No. 10,283,079.

(30) Foreign Application Priority Data

Feb. 21, 2014 (KR) .......................... 10-2014-0020811

(51) Int. Cl.
*G06F 1/3296* (2019.01)
*G09G 5/00* (2006.01)
*H04W 52/02* (2009.01)

(52) U.S. Cl.
CPC .......... *G09G 5/006* (2013.01); *G06F 1/3296* (2013.01); *H04W 52/027* (2013.01); *H04W 52/029* (2013.01); *G09G 2330/021* (2013.01); *Y02D 30/70* (2020.08)

(58) Field of Classification Search
CPC ........................ G06F 1/3296; G09G 2330/021; G09G 5/006; H04W 52/027; H04W 52/029; Y02D 70/1242; Y02D 70/1262; Y02D 70/142
See application file for complete search history.

(56) References Cited

U.S. PATENT DOCUMENTS

| 6,473,086 | B1 * | 10/2002 | Morein | ................ | G06T 15/005 345/422 |
| 7,196,700 | B1 * | 3/2007 | Aho | ......................... | G09G 3/20 345/211 |
| 2006/0033744 | A1 * | 2/2006 | Perez | .................. | H04W 52/027 345/502 |
| 2010/0167781 | A1 * | 7/2010 | Seo | ...................... | H04W 52/027 455/552.1 |
| 2010/0332022 | A1 * | 12/2010 | Wegelin | ................. | G16H 40/20 700/231 |
| 2011/0292432 | A1 | 12/2011 | Matsusaka | | |
| 2012/0058805 | A1 * | 3/2012 | Yoo | ................... | H04M 1/72536 455/574 |

OTHER PUBLICATIONS

Grant of Patent in connection with Korean Application No. 10-2014-0020811 dated Jul. 31, 2020, 3 pages.

* cited by examiner

*Primary Examiner* — Sing-Wai Wu

(57) ABSTRACT

A low power driving method includes receiving a signal for a sub control module from a main control module when an electronic device enters a low power mode. The low power driving method also includes transmitting display data to a display driving module in response to the signal.

20 Claims, 12 Drawing Sheets

LOW POWER DRIVING METHOD AND ELECTRONIC DEVICE PERFORMING THEREOF

CROSS-REFERENCE TO RELATED APPLICATIONS

This application is a continuation of U.S. application Ser. No. 14/627,941, filed Feb. 20, 2015, which claims priority to Korean Patent Application No. 10-2014-0020811, filed Feb. 21, 2014, the entire disclosures of which are incorporated herein by reference.

BACKGROUND

1. Field

The present disclosure relates to a low power driving method and an electronic device performing thereof.

2. Description of Related Art

Recently, mobile electronic devices such as smartphones, TVs, and tablet PCs support excellent performance and fast speed. Mobile electronic devices provide various user interface environments in order to increase the user's convenience. However, as hardware specifications become higher and functions and user interface environments become diversified, the amounts of power consumed by electronic devices are increased and accordingly, the battery capacities of the electronic devices grow gradually.

Electronic devices use various methods to minimize the power consumption, for example, turning off a specific function of an electronic device or adjusting brightness or color displayed on an electronic device after a predetermined time. Additionally, by a user's demand, power consumption is reduced by decreasing the speed at which a processor is driven (for example, clock speed).

SUMMARY

To address the above-discussed deficiencies, it is a primary object to provide a low power driving method and an electronic device for reducing power consumption to increase the operating time of an electronic device, thereby improving the usability of an electronic device.

According to certain embodiments of the present disclosure, a low power driving method includes: receiving a signal for a sub control module from a main control module when an electronic device enters a low power mode; and transmitting display data to a display driving module in response to the signal.

According to certain embodiments of the present disclosure, an electronic device includes: a display configured to be functionally connected to an electronic device; a sub control module configured to be driven in a low power mode of the electronic device; and a display driving module configured to store display data received from the sub control module in a first auxiliary storage device and deliver the display data stored in the first auxiliary storage device to a second auxiliary storage device.

According to certain embodiments of the present disclosure, provided is a non-transitory computer readable recoding medium having a program recorded thereon, which implements: receiving a signal for a sub control module from a main control module when an electronic device enters a low power mode; and transmitting display data to a display driving module in response to the signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
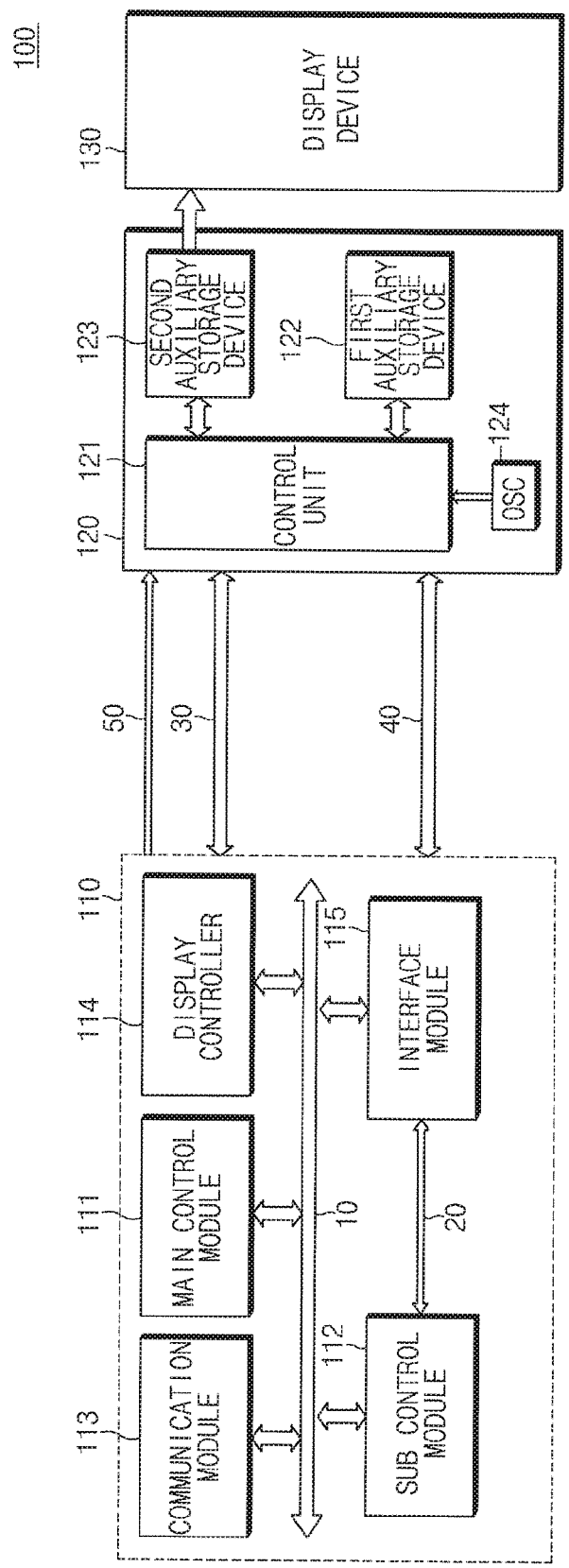
FIG. 1 illustrates an operation of an electronic device according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, various embodiments of the present disclosure are disclosed with reference to the accompanying drawings. Various modifications are possible in various embodiments of the present disclosure and specific embodiments are illustrated in drawings and related detailed descriptions are listed. Thus, it is intended that the present disclosure covers the modifications and variations of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. The meaning of "include," "comprise," "including," or "comprising," specifies a property, a region, a fixed number, a step, a process, an element or a component but does not exclude other properties, regions, fixed numbers, steps, processes, elements and/or components.

The meaning of the term "or" used herein includes any or all combinations of the words connected by the term "or". For instance, the expression "A or B" can indicate to include A, B, or both A and B.

The terms such as "1st", "2nd", "first", "second", and the like used herein can refer to modifying various different elements of various embodiments, but do not limit the elements. For instance, such terms do not limit the order or priority of the elements. Furthermore, such terms can be used to distinguish one element from another element. For instance, both "a first user device" and "a second user device" indicate a user device but indicate different user devices from each other. For example, a first component can be referred to as a second component and vice versa without departing from the scope of the present disclosure.

It will be understood that when an element is referred to as being "connected" or "coupled" to another element, it can be directly connected or coupled to the other element or intervening elements be present. In contrast, when an element is referred to as being "directly connected" or "directly coupled" to another element, there are no intervening elements present.

Terms used herein are used to describe specific embodiments, and are not intended to limit the scope of the present disclosure. The terms of a singular form can include plural forms unless they have a clearly different meaning in the context.

Unless otherwise defined herein, all the terms used herein, which include technical or scientific terms, can have the same meaning that is generally understood by a person skilled in the art. It will be further understood that terms, which are defined in the dictionary and in commonly used, should also be interpreted as is customary in the relevant related art and not in an idealized or overly formal sense unless expressly so defined herein in various embodiments of the present disclosure.

An electronic device according to various embodiments of the present disclosure can have a communication function. For instance, electronic devices can include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), digital audio players, mobile medical devices, cameras, and wearable devices (such as, head-mounted-devices (HMDs) such as electronic glasses, electronic apparel, electronic bracelets, electronic necklaces, electronic appcessories, electronic tattoos, and smart watches). According to some embodiments, an electronic device can be a smart home appliance having a communication function. The smart home appliances can include at least one of, for example, televisions, digital video disk (DVD) players, audios, refrigerators, air conditioners, cleaners, ovens, microwave ovens, washing machines, air cleaners, set-top boxes, TV boxes (such as, a SAMSUNG HOME SYNC® box, APPLE TV® box, or GOOGLE TV® box), game consoles, electronic dictionaries, electronic keys, camcorders, and electronic picture frames.

According to certain embodiments, an electronic device includes at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller's machines (ATMs), and stores' point of sales (POS).

According to certain embodiments, an electronic device includes at least one of furniture or buildings or structures supporting content output processing, electronic boards, electronic signature receiving devices, projectors, or various measuring instruments (for example, water, electricity, gas, or radio signal measuring instruments). An electronic device according to various embodiments be one of the above-mentioned various devices or a combination thereof. Additionally, an electronic device according to various embodiments of the present disclosure can be a flexible device. Furthermore, it is apparent to those skilled in the art that an electronic device according to various embodiments is not limited to the above-mentioned devices.

Hereinafter, an electronic device according to various embodiments will be described with the accompanying drawings. The term "user" in various embodiments can refer to a person using an electronic device or a device using an electronic device (for example, an artificial intelligent electronic device).

FIG. 1 illustrates an operation of an electronic device according to various embodiments of the present disclosure.

Referring to FIG. 1, an electronic device 100 includes an application processor (AP) 110, a display driving module 120, and a display device 130. The AP 110 includes a main control module 111, a sub control module 112, a communication module 113, a display controller 114, and an interface module 115. The display driving module 120 includes a control unit 121, a first auxiliary storage device 122 (for example, Random Access Memory (RAM)) and a second auxiliary storage device 123 (for example, Graphic RAM (GRAM)).

Only components relating to certain embodiments will be described in order not to obscure the features. Accordingly, it is apparent to those skilled in the art that other general components in addition to the components shown in FIG. 1 can be further included.

The electronic device 100 operates in a normal mode or a low power mode. The normal mode represents a state in which the electronic device 100 operates normally.

The low power mode represents a state in which power consumption is reduced by adjusting at least some functions of the electronic device 100 while the electronic device 100 operates. The low power mode is distinguished from a sleep mode in which the electronic device 100 temporarily limits functions of at least some units and stays in a standby state. For example, although functions (for example, the display) of at least some units are in a non-active state during the sleep mode, they are driven by lower power by adjusting at least some settings of at least some units during the low power mode. For example, during the low power mode, the AP 110 is in a non-active state, but the sub control module 112 or the communication module 113 can be in an active state.

The electronic device 100 enters the low power mode by user's manipulation, its own situation recognition of the electronic device 100, or external event occurrence of the electronic device 100. For example, when a user cannot charge the battery of the electronic device 100, for example, emergency situations such as disaster and distress, the user manually selects the low power mode to allow the electronic device 100 to enter the lower power mode. In certain embodiments, when the battery capacity of the electronic device 100 is running low, in order to maintain the basic function of the electronic device 100, the electronic device 100 autonomously enters the low power mode. In certain embodiments, when an emergency situation such as disaster and distress occurs, the electronic device 100 automatically enters the low power mode by recognizing a surrounding situation. In certain embodiments, when the electronic device 100 receives a message or push notification for notifying the occurrence of an emergency situation such as disaster and distress, it enters the lower power mode.

The AP 110 includes the main control module 111 and control a plurality of hardware or software components by driving an operating system or executing an application program. In certain embodiments, the AP 110 performs various data processing and arithmetic operations including multimedia data. For example, the AP 110 is implemented with a system on chip (SoC). According to certain embodiments, the AP 110 further includes other modules such as a Graphic Processing Unit (GPU) (not shown). Additionally, although it is shown in FIG. 1 that the AP 110 includes the sub control module 112 and the communication module 113, according to various embodiments, the sub control module 112 and the communication module 113 are included in a processor separated from the AP 110. For example, the sub control module 112 is included in an additional processor operating with low power.

The main control module 111 corresponds to a core of the AP 110 or a Central Processing Unit (CPU). When the electronic device 100 is in a normal mode, the AP 110 performs a related task. For example, in order to display time information in the electronic device 100, the AP 110 drives the display driving module 120. In certain embodiments, the main control module 111 of the AP 110 calculates the current time or receives the current time from the communication module 113. The main control module 111 transmits display data corresponding to the current time to the display driving module 120 through the display controller 114 and thereby, the current time is displayed on the screen of the display device 130.

When the electronic device 100 enters the low power mode, the sub control module 112 performs at least some task instead of the main control module 111. The main control module 111 transmits a signal to the sub control module 112, and the sub control module 112 is driven by the received signal. The signal includes a control signal for driving the sub control module 112 or an interrupt signal for a state change of the electronic device 100. For example, the main control module 111 transmits a state of the electronic device 100 or a state of the main control module 111. The sub control module 112 determines whether to operate on the basis of the received signal. For example, the main control module 111 transmits a control signal for driving the sub control module 112. After that, the main control module 111 hands over the control of at least some function or at least some units (for example, a display) to the sub control module 112, and the some function or the some units of the main control module 111 are deactivated. The electronic device 100 displays data on the screen of the display device 130 by the sub control module 112 without waking up the main control module 111.

When the electronic device 100 enters a low power mode, the sub control module 112 receives a signal from the main control module 111. Once the sub control module 112 is driven on the basis of the signal, the sub control module 112 transmits display data to the display driving module 120 through at least one of the interface module 115 and the display controller 114. The electronic device 100 reduces the power consumed by the AP 110 by using the sub control module 112 and the interface module 115.

According to certain embodiments, unlike the main control module 111, the sub control module 112 does not transmit display data in real-time continuously. In certain embodiments, the sub control module 112 transmits display data to the display driving module 120 at one time and then changes into a standby mode.

In the low power mode, the display driving module 120 stores display data received from the sub control module 112 in the first auxiliary storage device 122. The display driving module 120 then sequentially updates the second auxiliary storage device 123 with the display data stored in the first auxiliary storage device 122. By using the first auxiliary storage device 122 and the second auxiliary storage device 123, the sub control module 112 enters a standby mode while data is displayed on a display screen by the display driving module 120 and the display device 130.

The sub control module 112 enters a standby mode when a predetermined event occurs and transmits display data to the display driving module 120. The sub control module 112 detects a predetermined event for requesting the update of display data stored in the display driving module 120. The sub control module 112 enters from a sleep mode into an operating mode in response to the occurrence of the predetermined event. The sub control module 112 transmits display data to the display driving module 120. For example, a predetermined event can include a news update, message, push notification, or call.

In certain embodiments, the sub control module 112 transmits display data to the display driving module 120 at predetermined periods. For example, the sub control module 112 transmits display data by using an internal memory (not shown). The sub control module 112 stores display data in the internal memory and transmits the display data to the display driving module 120 at predetermined periods.

According to certain embodiments, the sub control module 112 receives display data from an external device (not shown) through a network by directly accessing the communication module 113. By directly accessing the communication module 113 without going through the main control module 111, the sub control module 112 reduces the power consumed due to wake-up of the main control module 111.

The sub control module 112 controls the display driving module 120 to display data on a partial area of a display screen of the electronic device 100. The display device 130 displays data by using only a partial area in the entire area of the display screen. In a low power mode, by reducing a display screen area where data is displayed, the power consumed for displaying data on a display screen and the power consumed for emitting backlight to a display screen is reduced. A specific description relating thereto refers to FIG. 7.

The sub control module 112 controls the display driving module 120 to lower a frame frequency of a display screen. By lowering a frame frequency of a display screen, the electronic device 100 reduces power consumption. For example, when the display device 130 displays a display screen at a frame frequency of 60 Hz in a normal mode, the sub control module 112 controls the display driving module 120 to display a display screen at a frame frequency of 30 Hz in a low power mode. In certain embodiments, the sub control module 112 controls the display driving module 120 to lower the illuminations of the display screen of the electronic device 100.

According to certain embodiments, the sub control module 112 further includes an internal memory (not shown). The internal memory (not shown) stores display data to be delivered from the sub control module 112 to the display driving module 120. In certain embodiments, an internal memory (not shown) stores commands, data, or programs, which are necessary for allowing the sub control module 112 to control the display driving module 120 in a low power mode. An internal memory (not shown) according to certain embodiments is implemented with Hard Disk Drive (HDD), Read Only Memory (ROM), Random Access Memory (RAM), Flash Memory, Memory Card, and Solid State Drive (SDD).

Although it is shown in FIG. 1 that the sub control module 112 is included in the AP 110, according to various embodiments, the sub control module 112 is included in a processor separated from the AP 110. A specific description relating thereto refers to FIG. 2.

The communication module 113 transmits or receives data to or from an external device (not shown) through a network. The communication module 113 according to this embodiment includes at least one of a cellular module, a Wi-Fi module, a Bluetooth (BT) module, a Global Positioning System (GPS) module, a Near Field communication (NFC) module, and a radio frequency (RF) module. In the communication module 113, at least part of a cellular module, a Wi-Fi module, a BT module, a GPS module, a NFC module, and an RF module is included in a processor separated from the AP 110. Although it is shown in FIG. 1 that the communication module 113 is included together with the main control module 111 in the AP 110, according to various embodiments, the communication module 113 is included in a processor separated from the AP 110.

The display controller 114 transmits display data received from the main control module 111 to the display driving module 120. Referring to FIG. 1, the display data 30 represents data delivered to the display driving module 120 through the display controller 114 for display on the display device 130. The display controller 114, according to certain embodiments, transmits data to the display driving module 120 at faster speed when compared to the interface module 115.

The display controller 114 according to this embodiment use at least one of RGB I/F, CPU I/F, Mobile Industry Processor Interface (MIPI), Mobile Display Digital Interface (MDDI), and Parallel Interface. However, the present disclosure is not limited thereto and the display controller 114 can use all interfaces for delivering display data to the display driving module 120 at faster speed than the interface module 115.

According to certain embodiments, the sub control module 112 transmits display data to the display driving module 120 by using the display controller 114. In certain embodiments, the sub control module 112 selects at least one from the display controller 114 and the interface module 115 according to the amount of transmission data and then transmits display data to the display driving module 120 by using the selected interface.

The interface module 115 transmits display data received from the sub control module 112 to the display driving module 120. The interface module 115 corresponds to a transmission interface for low power. Referring to FIG. 1, the display data 40 represents data delivered to the display driving module 120 through the interface module 115 for display on the display device 130. The interface module 115 transmits display data to the display driving module 120 through a small number of lines. For example, the interface module 115 transmits display data received from the sub control module 112 to the display driving module 120 through two data lines. When compared to the display controller 114, the interface module 115 transmits display data at slower data transfer rate but at lower power.

According to certain embodiments, in correspondence to a display interface (for example, MIPI and RGB Interface) used in the display controller 114 when in a normal mode of the electronic device 100 and a display interface (for example, I2C, UART, and SPI) used in the interface module 115 when in a low power mode, the display driving module 120 includes each separate interface module (not shown) in the control unit 121.

The interface module 115, according to certain embodiments, is at least one of an I2C interface, a Universal Asynchronous Receiver Transmitter (UART) interface, and a Serial Peripheral Interface (SPI). However, the present disclosure is not limited thereto and the interface module 115 can include all interfaces for delivering display data to the display driving module 120 at lower power than the display controller 114.

The bus 10 represents a transfer path for delivering data between each module. The AP 110 delivers data between each module through a bus inside the AP 110. The AP 110 delivers data between each module at fast speed by using the bus 10 of a fast clock.

In the low power mode, the sub control module 112 lowers the clock of the bus 10. The sub control module 112 receives display data from the communication module 113 or delivers display data to the display controller 114 or the interface module 115, by using the bus 10 inside the AP 110 at low power. In certain embodiments, when entering the low power mode, the main control module 111 lowers the clock of the bus 10. It is possible to lower the power consumption of the AP 110.

A dedicated interface 20 represents a transfer path for exclusively delivering data between two modules. The sub control module 112 delivers display data to the interface module 115 by using the dedicated interface 20 between the sub control module 112 and the interface module 115. In certain embodiments, the sub control module 112 receives display data from the communication module 113 by using a dedicated interface (not shown) between the sub control module 112 and the communication module 113. The AP 110 further reduces the power consumption when compared to using the high-speed bus 10. In certain embodiments, the sub control module 112 delivers display data to the display controller 114 at low power, including a dedicated interface (not shown) between the sub control module 112 and the display controller 114.

The display driving module 120 stores the display data received from the sub control module 112 in the first auxiliary storage device 122 and sequentially updates the display data of the second auxiliary storage device by using the display data stored in the first auxiliary storage device 122. According to certain embodiments, the display driving module 120 is implemented with a Display Driver IC (DDI).

In a normal mode, by receiving display data in real-time from the main control module 111, without storing the received display data in the first auxiliary storage device 122, the display driving module 120 updates the display data in the second auxiliary storage device 123.

In a low power mode, by receiving display data from the sub control module 112, the display driving module 120 stores the received display data in the first auxiliary storage device 122. Without transmitting display data in real-time from the sub control module 112, the display driving module 120 stores display data received at one time in the first auxiliary storage device 122 and delivers the display data stored in the first auxiliary storage device 122 to the second auxiliary storage device 123. According to various embodiments, the control unit 121 of the display driving module 120 sequentially delivers display data stored in the first auxiliary storage device 122 to the second auxiliary storage device 123. In certain embodiments, the control unit 121 of the display driving module 120 modifies display data stored in the first auxiliary storage device 122 to deliver the modified display data to the second auxiliary storage device 123.

Periodically or when a predetermined event (for example, an event for requesting update of display data stored in a display driving module 120) occurs, the sub control module 112 operates the modules of the electronic device 100, thereby reducing power consumption.

The display driving module 120 includes the control unit 121, the first auxiliary storage device 122, and the second auxiliary storage device 123. According to various embodiments, the first auxiliary storage device 122 is RAM and the second auxiliary storage device 123 is GRAM.

The control unit 121 sequentially updates the display data of the second auxiliary storage device 123 by using the display data stored in the first auxiliary storage device 122. In certain embodiments, the control unit 121 updates the second auxiliary storage device 123 according to a predefined update method, by using the display data stored in the first auxiliary storage device 122. For example, the predefined update method includes an update period and an update amount at one time.

According to various embodiments, the driving module 120 further includes an oscillator 124. The control unit 121 calculates the current time by using the oscillator 124 in the display driving module 120 and reports the calculated time to the second auxiliary storage device 123 periodically. Without receiving display data corresponding to the current time from the sub control module 112 or the main control module 111, the display driving module 120 display the current time on the display device 130 by using an internal clock of the display driving module 120 itself.

Then, the control unit 121 receives an external clock 50 from the outside of the display driving module 120 periodically to correct the calculated time. According to various embodiments, the display driving module 120 includes a power module for low power driving of the display device 130.

The display device 130 displays data updated in the second auxiliary storage device 123 of the display driving module 120. The display device 130 includes a touch screen, a touch display, a liquid crystal display, a thin film transistor-liquid crystal display, an organic light-emitting diode display, a flexible display, and a 3D display.

As mentioned above, when entering a low power mode, the electronic device 100 increases the operating time of the electronic device 100 by reducing the current consumption of the AP 110 through the sub control module 112.

Figure 2:
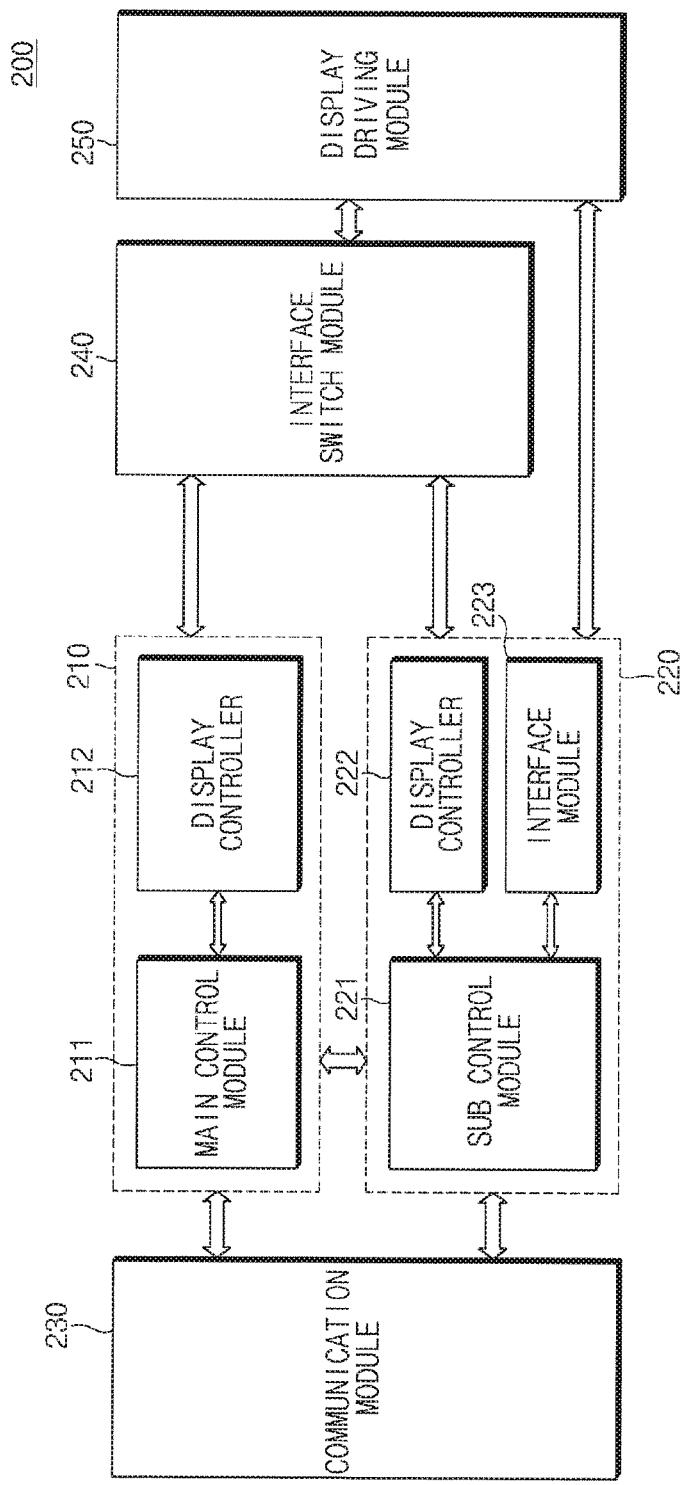
FIG. 2 illustrates an operation of an electronic device according to various embodiments of the present disclosure.

FIG. 2 illustrates an operation of an electronic device 200 according to various embodiments of the present disclosure.

Referring to FIG. 2, an electronic device 200 includes an AP 210, a low power processor 220, a communication module 230, an interface switch module 240, a display driving module 250, and a display device (not shown). The AP 210 includes a main control module 211 and a display controller 212. The low power processor 220 includes a sub control module 221, a display controller 222, and an interface module 223. Unlike the sub control module 112 shown in FIG. 1, the sub control module 221 of FIG. 2 is included in the low power processor 220 separated from the main control module 211.

The display driving module 250 of FIG. 2 and a display device (not shown) respectively correspond to the display driving module 120 and the display device 130 of FIG. 1, and the main control module 211, the sub control module 221, and the communication module 230 of FIG. 2 respectively correspond to the main control module 111, the sub control module 112, and the communication module 113 of FIG. 1. Therefore, overlapping description is omitted.

Only components relating to certain embodiments will be described in order not to obscure the features. Accordingly, it is apparent to those skilled in the art that other general components in addition to the components shown in FIG. 2 can be further included.

The electronic device 200 enters the low power mode by a user's manipulation, its own situational recognition of the electronic device 200, or an external event occurrence.

The AP 210 includes the main control module 211 and controls a plurality of hardware or software components by driving an operating system or executing an application program. The AP 210 performs data processing and arithmetic operations on various data including multimedia data. According to various embodiments, the AP 210 further includes other modules such as a Graphic Processing Unit (GPU) (not shown).

When the electronic device 200 enters a low power mode, the main control module 211 drives the sub control module 221. After driving the sub control module 221, the main control module 211 deactivates the display control of the main control module 211.

The display controller 212 transmits display data received from the main control module 211 to the display driving module 250. The display controller 212 according to certain embodiments transmits data to the display driving module 250 at faster speed when compared to the interface module 223.

The display controller 212 according to this embodiment uses at least one of RGB I/F, CPU I/F, MIPI, MDDI, and Parallel Interface. However, the present disclosure is not limited thereto and the display controller 212 can use all interfaces for delivering display data to the display driving module 250 at faster speed than the interface module 223.

The low power processor 220 operates in a low power mode of the electronic device 200 and delivers display data to the display driving module 250 in the low power mode.

When compared to another processor such as the AP 210, the low power processor 220 reduces power consumption by using a low power IC consuming less power.

Once the low power processor 220 is driven, the sub control module 221 transmits display data to the display driving module 250 through the display controller 222 or the interface module 223.

According to various embodiments, periodically or when a predetermined event occurs, the sub control module 221 enters from a standby mode into an operating mode and transmits display data to the display driving module 250. The predetermined event represents an event for requesting update of display data stored in the display driving module 250. For example, a predetermined event includes a news update, message, push notification, or call.

According to various embodiments, the sub control module 221 receives display data directly from the communication module 230. By directly accessing the communication module 230 without going through the AP 210, the sub control module 221 reduces power consumed due to wake-up of the AP 210. The sub control module 221 controls the display driving module 250 through the interface module 223 to display data on a partial area of a display screen of the electronic device 200, to lower a frame frequency of a display screen, or to lower the illuminations of the display screen of the electronic device 200.

The sub control module 221 further includes an internal memory (not shown). The internal memory (not shown) stores display data to be delivered from the sub control module 221 to the display driving module 250, or stores commands, data, or programs, which are necessary for allowing the sub control module 221 to control the display driving module 250 in a low power mode.

The display controller 222 transmits display data received from the sub control module 221 to the interface switch module 240. When compared to the interface module 223, the display controller 222, according to certain embodiments, is used when transmitting a large amount of data to the display driving module 250. The display controller 222 transmits data at faster speed through a display interface (for example, an RGB interface, a CPU interface, an MIPI, an MDDI, and a parallel interface).

The display controller 222, according to certain embodiments, uses at least one of RGB I/F, CPU I/F, MIPI, MDDI, and Parallel Interface. However, the present disclosure is not limited thereto and the display controller 222 can use all interfaces for delivering display data to the display driving module 250 at faster speed than the interface module 223.

The interface module 223 transmits display data received from the sub control module 221 to the display driving module 250. The interface module 223 transmits display data to the display driving module 250 through a small number of lines. When compared to the display controller 14, the interface module 223 transmits display data at slower data transfer rate but at lower power.

The interface module 223 according to this embodiment is at least one of an I2C interface, a UART interface, and an SPI. However, the present disclosure is not limited thereto and the interface module 223 can include all interfaces for delivering display data to the display driving module 250 at lower power than the display controller 222.

According to various embodiments, the sub control module 221 selects at least one interface from the display controller 222 and the interface module 223 according to the amount of transmission data and then transmits display data to the display driving module 250 by using the selected interface.

The communication module 230 transmits or receives data to or from an external device (not shown) through a network. The communication module 230 according to this embodiment includes at least one of a cellular module, a WiFi module, a BT module, a GPS module, an NFC module, and a RF module. Although it is shown in FIG. 2 that the communication module 230 is included in a processor separated from the AP 210, according to various embodiments, the communication module 230 be included in the AP 210.

The interface switch module 240 switches an interface for delivering display data to the display driving module 250. The interface switch module 240 connects one of the display controller 222 of the sub control module 221 and the display controller 212 of the main control module 211 to the display driving module 250. The interface switch module 240 can be differently implemented according to the type of the display controller 212 or 222. For example, the interface switch module 240 can be an MIPI interface switch or an RGB interface switch.

When the display controller 212 of the AP 210 and the display controller 222 of the low power processor 220 have different interface types, the interface switch module 240 further include an interface converter (not shown). For example, when the display controller 212 of the AP 210 uses the MIPI interface and the display controller 222 of the low power processor 220 uses the RGB interface, the interface switch module 240 further include an interface converter (not shown) for converting the RGB interface received from the low power processor 220 into the MIPI interface.

According to various embodiments, the display driving module 250 includes an interface module having different types of interfaces. For example, the display driving module 250 includes an interface module for the MIPI interface and I2C interface.

The display driving module 250 stores the display data received from the sub control module 221 in a first auxiliary storage device and sequentially updates display data of a second auxiliary storage device by using the display data stored in the first auxiliary storage device 122.

Figure 3:
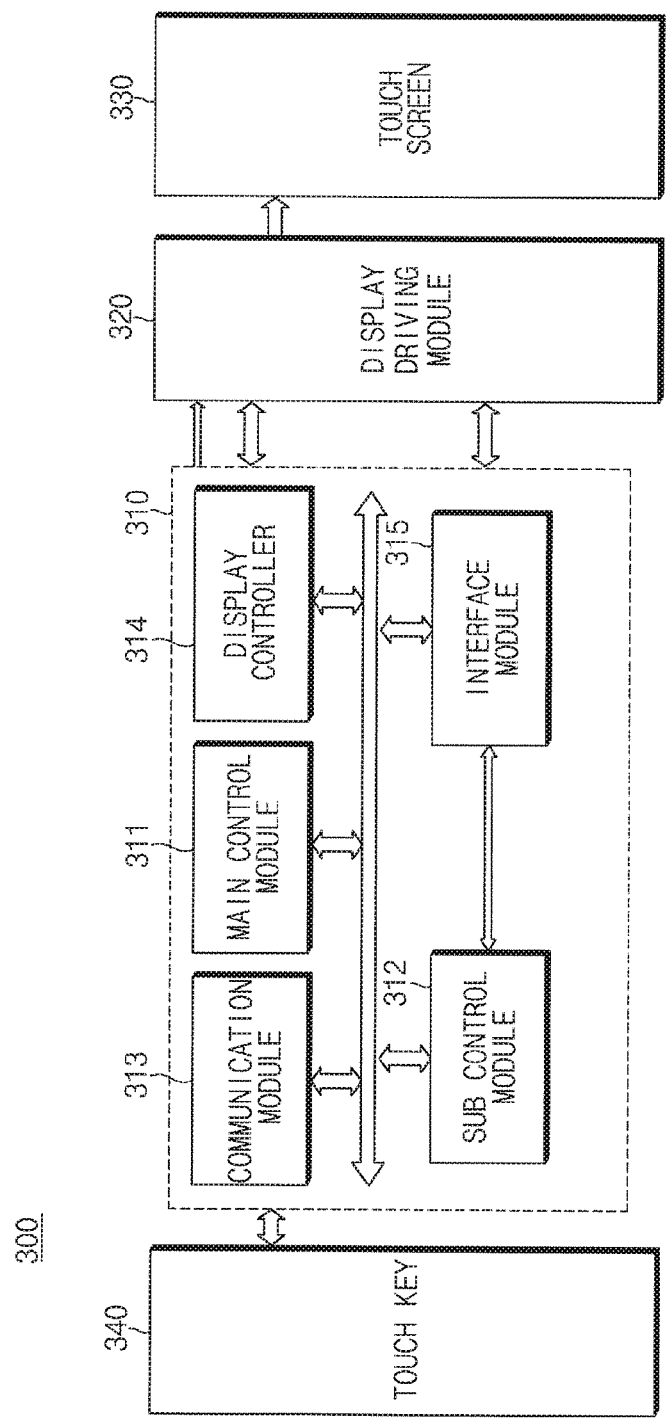
FIG. 3 illustrates an operation of an electronic device according to various embodiments of the present disclosure.

FIG. 3 illustrates an operation of an electronic device according to various embodiments of the present disclosure.

Referring to FIG. 3, an electronic device 300 includes an AP 310, a display driving module 320, a touch screen 330, and a touch key 340. The AP 310, the display driving module 320, and the touch screen 330 of FIG. 3 correspond to the AP 110, the display driving module 120, and the display device 130 of FIG. 1, respectively. Therefore, overlapping description is omitted.

Only components relating to certain embodiments will be described in order not to obscure the features. Accordingly, it is apparent to those skilled in the art that other general components in addition to the components shown in FIG. 3 can be further included. The electronic device 300 enters the low power mode by user's manipulation, its own situation recognition of the electronic device 300, or external event occurrence.

The AP 310 includes the main control module 311 and controls a plurality of hardware or software components by driving an operating system or executing an application program. Although it is shown in FIG. 3 that the AP 310 includes both the sub control module 312 and the communication module 313, according to various embodiments, the sub control module 312 and the communication module 313 are included in a processor separated from the AP 310.

According to various embodiments, the main control module 311 or the sub control module 312 control the touch screen 330 to display an icon corresponding to the touch key 340 on the touch screen 330. The displayed icon performs the same function as the touch key 340. For example, the main control module 311 or the sub control module 312 controls the touch screen 330 through the display driving module 320 or deactivates the touch key 340.

According to certain embodiments, the main control module 311 or the sub control module 312 controls the touch key 340 to reduce the key scan frequency of the touch key 340 of the electronic device 300.

According to certain embodiments, the main control module 311 or the sub control module 312 controls the touch key 340 to turn off the backlight of the touch key 340 of the electronic device 300.

Figure 4:
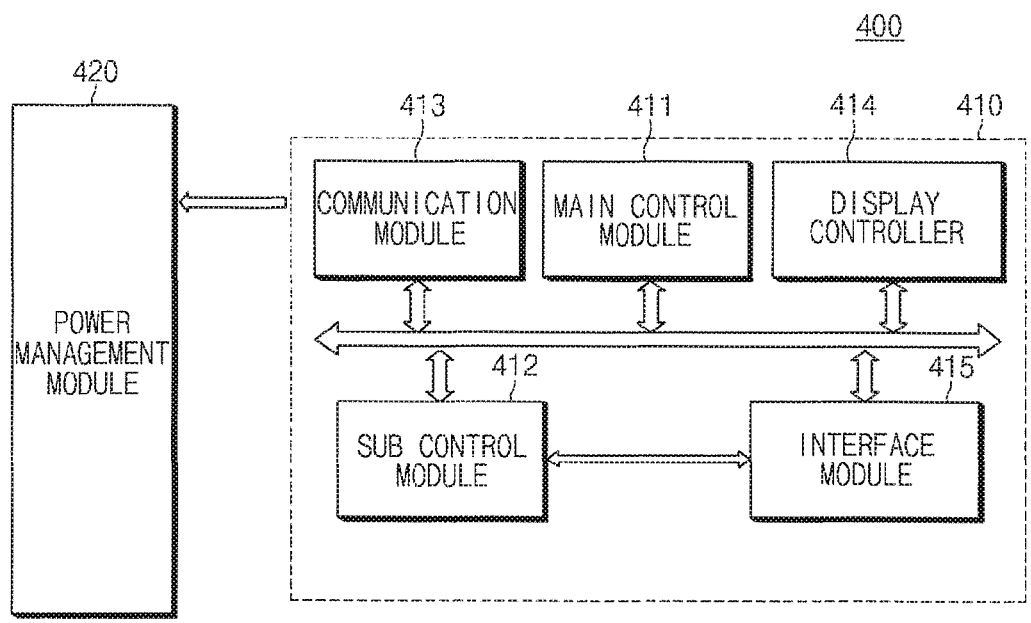
FIG. 4 illustrates an operation of an electronic device according to various embodiments of the present disclosure.

FIG. 4 illustrates an operation of an electronic device according to various embodiments of the present disclosure.

Referring to FIG. 4, the electronic device 400 includes an AP 410 and a power management module 420. The AP 410 of FIG. 4 corresponds to the AP 110 of FIG. 1. Therefore, overlapping description is omitted.

Only components relating to certain embodiments will be described in order not to obscure the features. Accordingly, it is apparent to those skilled in the art that other general components in addition to the components shown in FIG. 4 can be further included.

The electronic device 400 enters the low power mode by user's manipulation, its own situation recognition of the electronic device 400, or external event occurrence.

The AP 410 includes the main control module 411 and controls a plurality of hardware or software components by driving an operating system or executing an application program. Although it is shown in FIG. 4 that the AP 410 includes both the sub control module 412 and the communication module 413, according to various embodiments, the sub control module 412 and the communication module 413 are included in a processor separated from the AP 410.

According to various embodiments, the main control module 411 or the sub control module 412 controls the power management module 430 to lower the power-off voltage of the electronic device 400 to the cutoff voltage of the battery cell. In certain embodiments, the power-off voltage represents a voltage for cutting off the power of the electronic device 400, which is minimum voltage determined for a stable operation of the electronic device 400.

For example, even when the battery capacity of the electronic device 400 still remains, in order for the stability of the electronic device 400, the electronic device 400 cuts off the power of the electronic device 400 when a battery voltage reaches the power-off voltage. According to certain embodiments, the main control module 411 or the sub control module 412 controls a fuel gauge to lower the power-off voltage of the electronic device 400 to the cutoff voltage of the battery cell. In an emergency situation, a user uses the electronic device 400 until the battery is out of power, and the electronic device 400 operates as long as possible.

The power management module 420 manages the power of the electronic device 400. For example, the power management module 420 includes a Power Management Integrated Circuit (PMIC) or a fuel gauge, for example.

Figure 5:
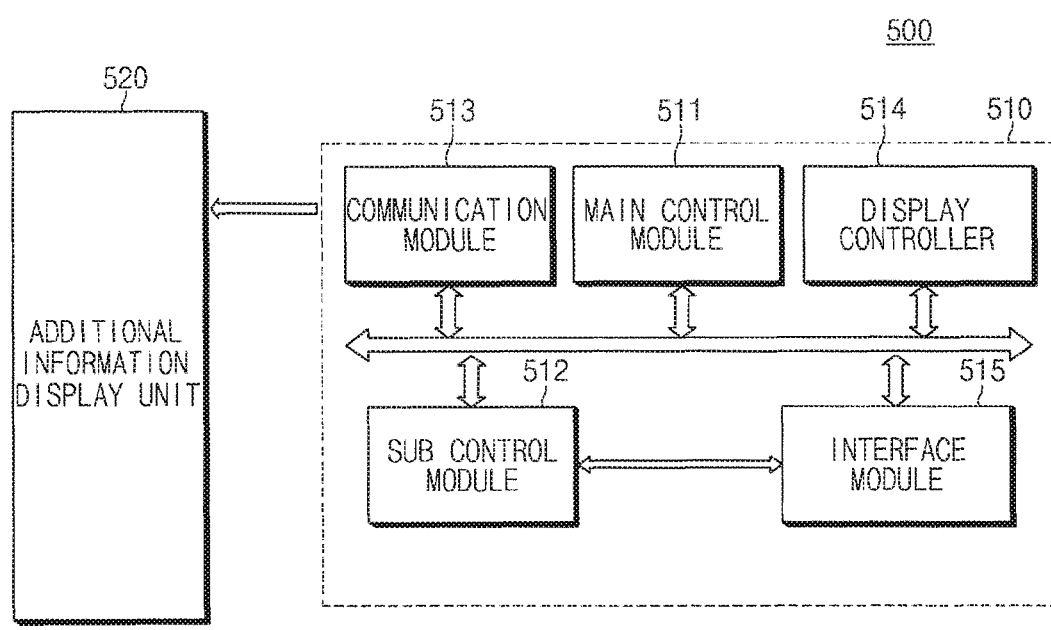
FIG. 5 illustrates an operation of an electronic device according to various embodiments of the present disclosure.

FIG. 5 illustrates an operation of an electronic device according to various embodiments of the present disclosure.

Referring to FIG. 5, the electronic device 500 includes an AP 510 and an additional information display unit 520. The AP 510 of FIG. 5 corresponds to the AP 110 of FIG. 1. Therefore, overlapping description is omitted.

Only components relating to certain embodiments will be described in order not to obscure the features. Accordingly, it is apparent to those skilled in the art that other general components in addition to the components shown in FIG. 5 can be further included.

The electronic device 500 enters the low power mode by user's manipulation, its own situational recognition of the electronic device 500, or external event occurrence.

The AP 510 includes the main control module 511 and controls a plurality of hardware or software components by driving an operating system or executing an application program. Although it is shown in FIG. 5 that the AP 510 includes both the sub control module 512 and the communication module 513, according to various embodiments, the sub control module 512 and the communication module 513 are included in a processor separated from the AP 510.

The additional information display unit 520 receives a signal relating to a network state from the communication module 513 and displays the network state on the additional information display unit 520 on the basis of the received signal. For example, the additional information display unit 520 includes an LED, a touch key, a sub display, a side display, and a rear display.

According to various embodiments, the main control module 511 or the sub control module 512 controls the additional information display unit 520 to display a network state on the additional information display unit 520, or, checks a network state by directly accessing the communication module 513 and displays the network state on the additional information display unit 520. For example, the main control module 511 or the sub control module 521 checks a service network state by directly accessing the communication module 513 through a General Purpose IO (GPIO) 1 pin of the communication module 513.

According to various embodiments, the GPIO 1 pin of the communication module 513 is directly connected to the additional information display unit, and the signal relating to a network state is delivered through the GPIO 1 pin. A service network state is checked with low power by using the additional information display unit 520. For example, the additional information display unit 520 is an LED and a user checks a service network state through an ON or OFF of the LED. In order for an ON or OFF of the LED, a switch such as an FET switch is used.

Figure 6:
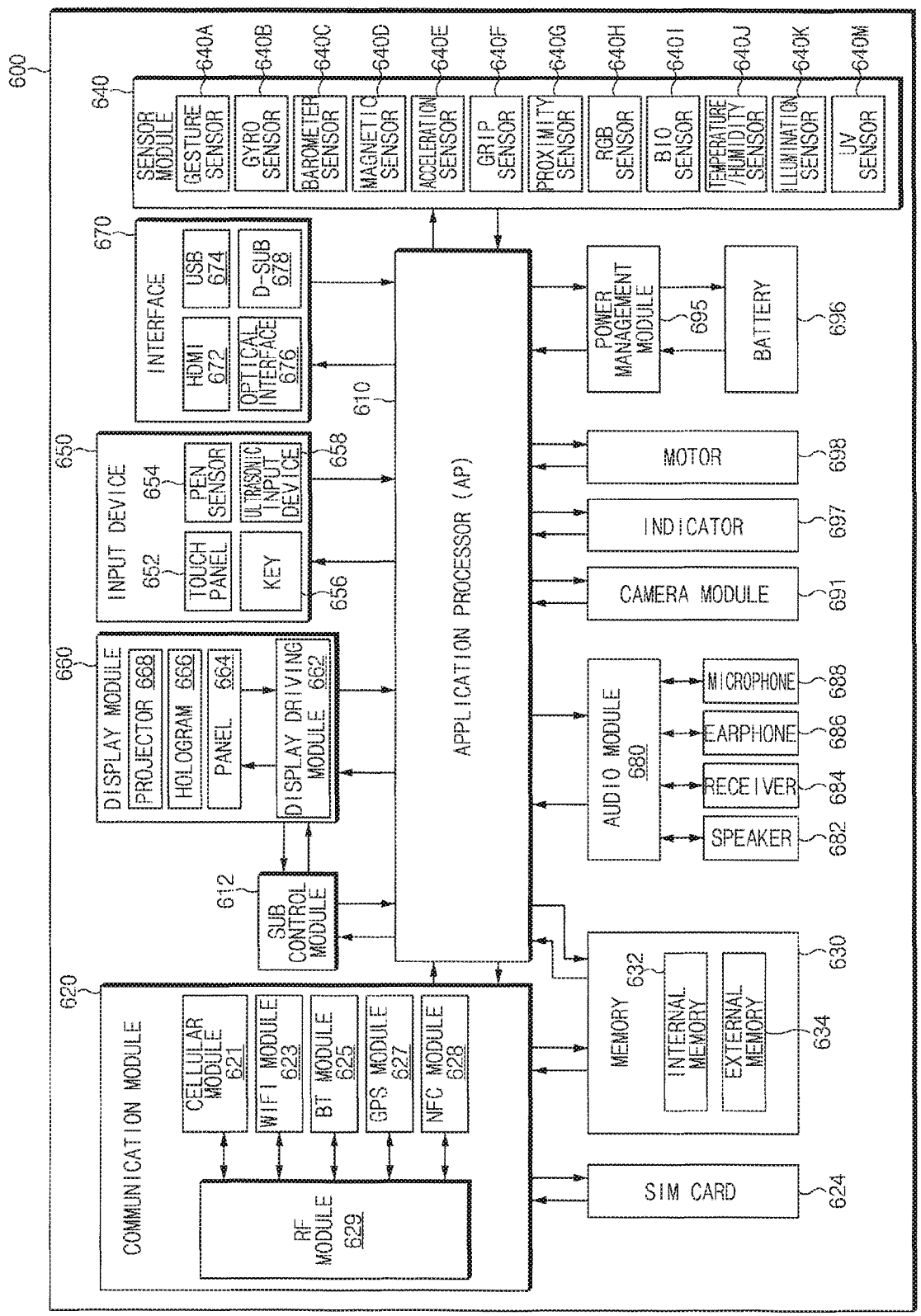
FIG. 6 illustrates an electronic device according to various embodiments of the present disclosure.

FIG. 6 illustrates an electronic device 600 according to various embodiments of the present disclosure. The electronic device 600, for example, configures all or part of the above-mentioned electronic device 100, 200, 300, 400, or 500 shown in FIGS. 1 to 5.

Referring to FIG. 6, the electronic device 600 includes at least one application processor (AP) 610, a sub control module 612, a communication module 620, a SIM card 624, a memory 630, a sensor module 640, an input device 650, a display module 660, an interface 670, an audio module 680, a camera module 691, a power management module 695, a battery 696, an indicator 697, and a motor 698.

The AP 610 controls a plurality of hardware or software components connected to the AP 610 and also performs processing and operations on various data including multimedia data by executing an operating system or an application program. The AP 610 is implemented with a system on chip (SoC), for example. According to various embodiments, the AP 610 further includes a graphic processing unit (GPU) (not shown). Although it is shown in FIG. 6 that the sub control module 612 is included in a processor separated from the AP 610, according to various embodiments, the sub control module 612 is included in the AP 610.

When the electronic device 600 enters a low power mode, the sub control module 612 operates the modules of the electronic device 600. The sub control module 612 reduces the power consumption by controlling other modules in a low power mode. For example, the sub control module 612 transmits display data to the display driving module 662 in a low power mode.

The communication module 620 performs data transmission in a communication between the electronic device 600 and other electronic devices connected thereto through a network. According to various embodiments, the communication module 620 includes a cellular module 621, a Wi-Fi module 623, a BT module 625, a GPS module 627, an NFC module 628, and an RF module 629.

The cellular module 621 provides voice calls, video calls, text message services, or internet services through a communication network (for example, LTE, LTE-A, CDMA, WCDMA, UMTS, WiBro, or GSM). The cellular module 621 identifies and authenticates an electronic device in a communication network by using a subscriber identification module (for example, the SIM card 624), for example. According to certain embodiments, the cellular module 621 performs at least part of a function that the AP 610 provides. For example, the cellular module 621 performs at least part of a multimedia control function.

According to certain embodiments of the present disclosure, the cellular module 621 includes a communication processor (CP) and is implemented with SoC, for example. As shown in FIG. 6, components such as the cellular module 621 (for example, a CP), the memory 630, and the power management module 695 are separated from the AP 610, but according to certain embodiments, the AP 610 is implemented including some of the above-mentioned components (for example, the cellular module 621).

According to certain embodiments, the AP 610 or the cellular module 621 (for example, a CP) loads instructions or data, which are received from at least one of a nonvolatile memory and one of other components connected thereto, into a volatile memory and then processes the instructions or data. The AP 610 or the cellular module 621 stores data received from or generated by at least one of other components in a nonvolatile memory.

Each of the Wi-Fi module 623, the BT module 625, the GPS module 627, and the NFC module 628 includes a processor for processing data transmitted or received through a corresponding module. Although the cellular module 621, the Wi-Fi module 623, the BT module 625, the GPS module 627, and the NFC module 628 are shown as separate blocks in FIG. 6, according to certain embodiments, some modules (for example, at least two) of the cellular module 621, the Wi-Fi module 623, the BT module 625, the GPS module 627, and the NFC module 628 are included in one integrated chip (IC) or an IC package. For example, at least some modules (for example, a CP corresponding to the cellular module 621 and a Wi-Fi processor corresponding to the Wi-Fi module 623) among the processors respectively corresponding to the cellular module 621, the Wi-Fi module 623, the BT module 625, the GPS module 627, and the NFC module 628 are implemented with a single SoC.

The RF module 629 is responsible for data transmission/reception, for example, the transmission or reception of an RF signal. Although not shown in the drawings, the RF module 629 includes, for example, a transceiver, a power amp module (PAM), a frequency filter, or a low noise amplifier (LNA). The RF module 629 further includes components for transmitting or receiving electromagnetic waves in a free space as a wireless communication, for example, conductors or conducting wires. Although the cellular module 621, the Wi-Fi module 623, the BT module 625, the GPS module 627, and the NFC module 628 share one RF module 629 as shown in FIG. 6, according to certain embodiments, at least one of the cellular module 621, the Wi-Fi module 623, the BT module 625, the GPS module 627, and the NFC module 628 performs the transmission of an RF signal through an additional RF module.

The SIM card 624 is a card including a subscriber identification module and is inserted into a slot formed at a specific location of an electronic device. The SIM card 624 includes a unique identification information (for example, an integrated circuit card identifier (ICCID)) or subscriber information (for example, an international mobile subscriber identity (IMSI)).

The memory 630 includes an internal memory 632 or an external memory 634. The internal memory 632 includes at least one of a volatile memory (for example, dynamic random access memory (DRAM), static RAM (SRAM), synchronous dynamic RAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, Not AND (NAND) flash memory, and Not OR (NOR) flash memory).

According to certain embodiments, the internal memory 632 is a Solid State Drive (SSD). The external memory 634 further includes flash drive, for example, compact flash (CF), secure digital (SD), Micro-SD, Mini-SD, extreme digital (xD), or a memory stick. The external memory 634 is functionally connected to the electronic device 600 through various interfaces. According to certain embodiments, the electronic device 600 further includes a storage device (or a storage medium) such as a hard drive.

The sensor module 640 measures physical quantities or detects an operating state of the electronic device 600, thereby converting the measured or detected information into electrical signals. The sensor module 640 includes at least one of a gesture sensor 640A, a gyro sensor 640B, a pressure sensor 640C, a magnetic sensor 640D, an acceleration sensor 640E, a grip sensor 640F, a proximity sensor 640G, a color sensor 640H (for example, a red, green, blue (RGB) sensor), a bio sensor 640I, a temperature/humidity sensor 640J, an illumination sensor 640K, and an ultra violet (UV) sensor 640M. In certain embodiments, the sensor module 640 includes an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 640 further includes a control circuit for controlling at least one sensor therein.

The user input device 650 includes a touch panel 652, a (digital) pen sensor 654, a key 656, or an ultrasonic input device 658. The touch panel 652 recognizes a touch input through at least one of capacitive, resistive, infrared, or ultrasonic methods, for example. The touch panel 652 further includes a control circuit. In the case of the capacitive method, both direct touch and proximity recognition are possible. The touch panel 652 further includes a tactile layer for providing a tactile response to a user.

The (digital) pen sensor 654 is implemented through a method similar or identical to that of receiving a user's touch input or an additional sheet for recognition. The key 656 includes a physical button, a touch key, an optical key, or a keypad, for example. The ultrasonic input device 658, as a device checking data by detecting sound waves through a microphone (for example, the mic 688) in the electronic device 600, provides wireless recognition through an input tool generating ultrasonic signals. According to certain embodiments, the electronic device 600 receives a user input from an external device (for example, a computer or a server) connected to the electronic device 1801 through the communication module 620.

The display module 660 includes a display driving module 662, a panel 664, a hologram device 666, or a projector 668. According to certain embodiments, the display driving module 662 further includes a control circuit for controlling the panel 664, the hologram device 666, or the projector 668. The panel 664 includes a liquid-crystal display (LCD) or an active-matrix organic light-emitting diode (AM-OLED). The panel 664 is implemented to be flexible, transparent, or wearable, for example. The panel 664 and the touch panel 652 can be configured with one module. The hologram 666 shows three-dimensional images in the air by using the interference of light. The projector 668 displays an image by projecting light on a screen. The screen, for example, can be placed inside or outside the electronic device 600.

The interface 670 includes a high-definition multimedia interface (HDMI) 672, a universal serial bus (USB) 674, an optical interface 676, or a D-subminiature (sub) 678, for example. In certain embodiments, the interface 670 includes a mobile high-definition link (MHL) interface, a secure Digital (SD) card/multi-media card (MMC) interface, or an infrared data association (IrDA) standard interface.

The audio module 680 converts sound into electrical signals and converts electrical signals into sounds. The audio module 680 processes sound information input or output through a speaker 682, a receiver 684, an earphone 686, or a mic 688.

The camera module 691 capturing a still image and a video, according to certain embodiments, includes at least one image sensor (for example, a front sensor or a rear sensor), a lens (not shown), an image signal processor (ISP) (not shown), or a flash (not shown) (for example, an LED or a xenon lamp).

The power management module 695 manages the power of the electronic device 600. Although not shown in the drawings, the power management module 695 includes a power management IC (PMIC), a charger integrated circuit (IC), or a battery or fuel gauge, for example.

The PMIC is built in an IC or SoC semiconductor, for example. A charging method is classified into a wired method and a wireless method. The charger IC charges a battery and prevents overvoltage or overcurrent flow from a charger. According to certain embodiments, the charger IC includes a charger IC for at least one of a wired charging method and a wireless charging method. Wireless charging methods include, for example, a magnetic resonance method, a magnetic induction method, or an electromagnetic method. An additional circuit for wireless charging including, for example, a circuit such as a coil loop, a resonant circuit, or a rectifier circuit, can be added.

The battery gauge measures the remaining amount of the battery 696, or a voltage, current, or temperature of the battery 696 during charging. The battery 696 stores or generates electricity and supplies power to the electronic device 600 by using the stored or generated electricity. The battery 696, for example, includes a rechargeable battery or a solar battery.

The indicator 697 displays a specific state of the electronic device 600 or part thereof (for example, the AP 610), for example, a booting state, a message state, or a charging state. The indicator 697 includes an LED. The motor 698 converts electrical signals into mechanical vibration. Although not shown in the drawings, the electronic device 600 includes a processing device (for example, a GPU) for mobile TV support. A processing device for mobile TV support processes media data according to the standards such as digital multimedia broadcasting (DMB), digital video broadcasting (DVB), or media flow.

Figure 7:
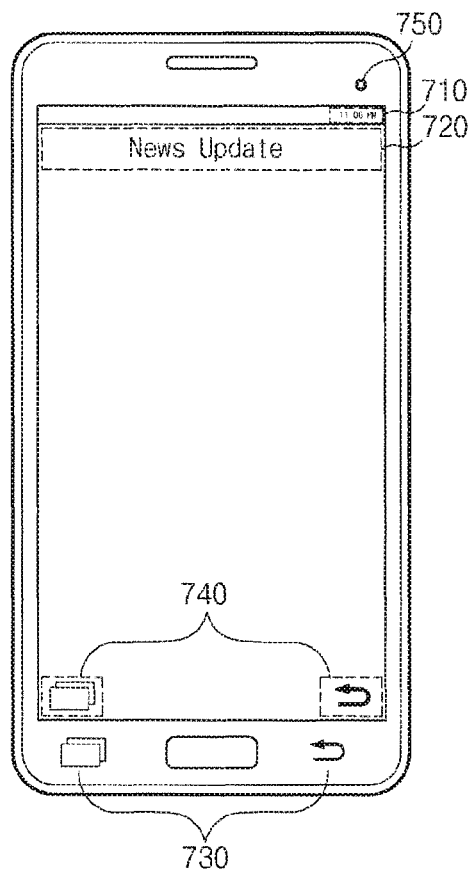
FIG. 7 illustrates a display screen displayed when an electronic device is in a low power mode according to various embodiments of the present disclosure.

FIG. 7 illustrates a display screen displayed when an electronic device is in a low power mode according to various embodiments of the present disclosure.

The display screen of FIG. 7 represents a screen displayed by the electronic device 100, 200, 300, 400, 500, or 600 shown in FIGS. 1 to 6. Accordingly, even omitted contents, which are described for the electronic device 100, 200, 300, 400, 500, or 600 shown in FIGS. 1-6, can be applied to FIG. 7.

The sub control module 112 controls the display driving module 120 through the display controller 114 to display data in a partial area of the display screen of the electronic device 100. In certain embodiments, the display device 180 displays data only in partial areas 710, 720, and 740 of the display screen.

According to certain embodiments, the display driving module 120 displays the current time on the display device 130 by using the internal clock of the display driving module 120. A user checks a time from area 710 (such as time information) from the display screen without waking up the AP 110 of the electronic device 100. In certain embodiments, the display driving module 120 receives an external clock 50 periodically and correct a time by internal clock, thereby increasing the time accuracy.

According to various embodiments, the display driving module 120 receives display data at one time from the sub control module 112 and stores the received display data in the first auxiliary storage device 122. In certain embodiments, periodically or when a predetermined event occurs, the sub control module 221 enters from a standby mode into an operating mode to transmit display data to the display driving module 250. For example, the predetermined event represent an event for requesting update of display data stored in the display driving module 250, for example, news update, message, and push notification.

The display driving module 120 delivers the display data stored in the first auxiliary storage device 122 to the second auxiliary storage device 123. The display driving module 120 delivers the display data stored in the first auxiliary storage device 122 according to a predefined update method. For example, the predefined update method includes an update interval and an update amount at one time. In certain embodiments, the display driving module 120 modifies the display data stored in the first auxiliary storage device 122 and delivers the modified display data to the second auxiliary storage device 123.

The display driving module 120 updates the display data of the second auxiliary storage device 123 by using the display data stored in the first auxiliary storage device 122 at predetermined time intervals. In a limited display screen, which is a partial area of a display screen, as shown in FIG. 7, the updated news content is sequentially displayed on the display screen at predetermined periods.

According to certain embodiments, the sub control module 112 controls the display driving module 120 to display an icon performing the same function as the touch key on a touch screen.

Referring to FIG. 7, the sub control module 112 deactivates the touch key 730 and display the icon 740 corresponding to the touch key 730 on the display screen. For example, the icon 740 displayed on a display screen includes a menu, a back, and a home key.

By displaying the icon 740 on a display screen instead of the touch key 730, the power consumed for controlling the touch key 730 is reduced.

According to certain embodiments, the sub control module 112 controls an LED 750 to display a network state through the LED 750 during a low power mode. The main control module 511 or the sub control module 512 checks a network state by directly accessing the communication module 513. In certain embodiments, the LED 750 receives a signal relating to a network state by directly connecting to the communication module 513 and displays a service network state through a change of the LED 750 on the basis of the received signal at low power. For example, a change of the LED 750 includes switching ON or OFF, a color change, and a brightness change.

As shown in FIG. 7, a user check a service network state through ON or OFF of the LED 750.

According to certain embodiments, the LED 750 is used for purposes other than for representing a service network state in a normal mode, or is not used for a normal mode, but used only for a low power mode.

Figure 8:
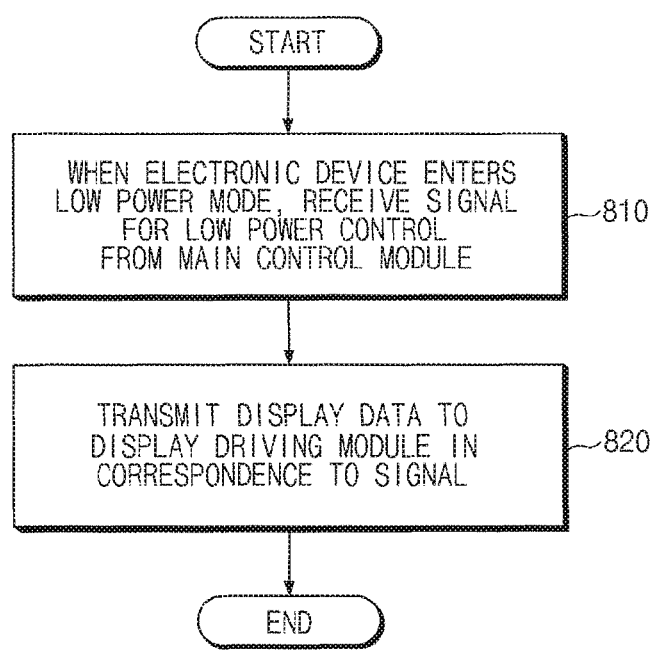
FIG. 8 illustrates a low power driving process according to various embodiments of the present disclosure.

FIG. 8 illustrates a low power driving process according to various embodiments of the present disclosure. The process disclosed in FIG. 8 includes steps processed in the electronic device 100, 200, 300, 400, 500, or 600 shown in FIGS. 1-7. In certain embodiments, even omitted contents, which are described above for the electronic device 100, 200, 300, 400, 500, or 600 shown in FIGS. 1-7, are applied to the process described with reference to FIG. 8.

In step 810, when the electronic device 100 enters a low power mode, the sub control module 112 receives a signal for low power control from the main control module 111.

In step 820, the sub control module 112 transmits display data to the display driving module 120 in response to the signal.

The power consumption of the electronic device 100 is reduced by controlling the display driving module 120 through the sub control module 112.

Figure 9:
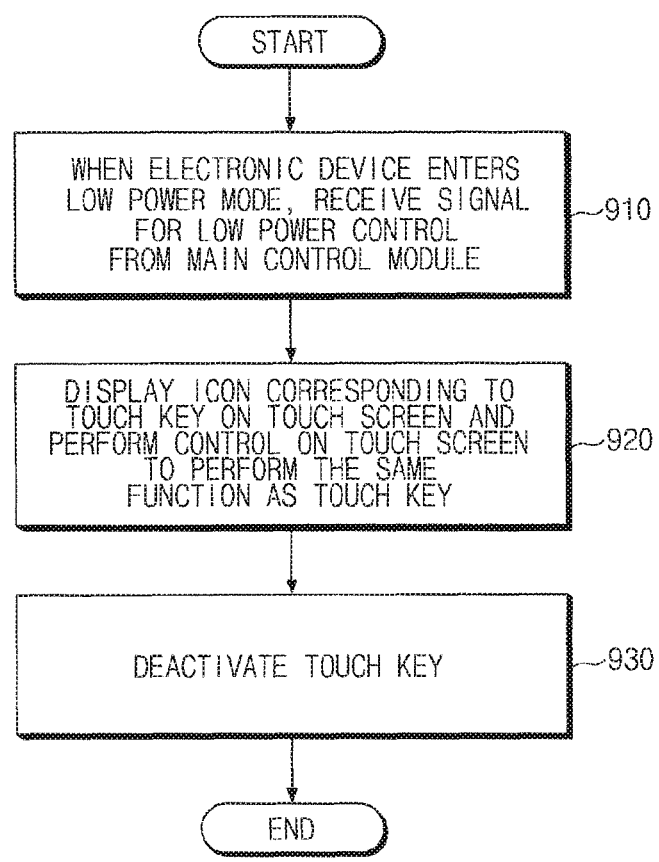
FIG. 9 illustrates a low power driving process according to various embodiments of the present disclosure.

FIG. 9 illustrates a low power driving process according to various embodiments of the present disclosure. The process disclosed in FIG. 9 includes steps processed in the electronic device 100, 200, 300, 400, 500, or 600 shown in FIGS. 1-7. In certain embodiments, even omitted contents, which are described above for the electronic device 100, 200, 300, 400, 500, or 600 shown in FIGS. 1-7, are applied to the process described with reference to FIG. 9.

In step 910, when the electronic device 100 enters a low power mode, the sub control module 112 receives a signal for low power control from the main control module 111.

In step 920, the sub control module 112 displays an icon which performs the same function as the touch key 340 on a touch screen through the control of the touch screen.

In step 930, the sub control module 112 deactivates the touch key 340.

The power consumption of the electronic device 100 is reduced by substituting the touch key 340 through the sub control module 112.

Figure 10:
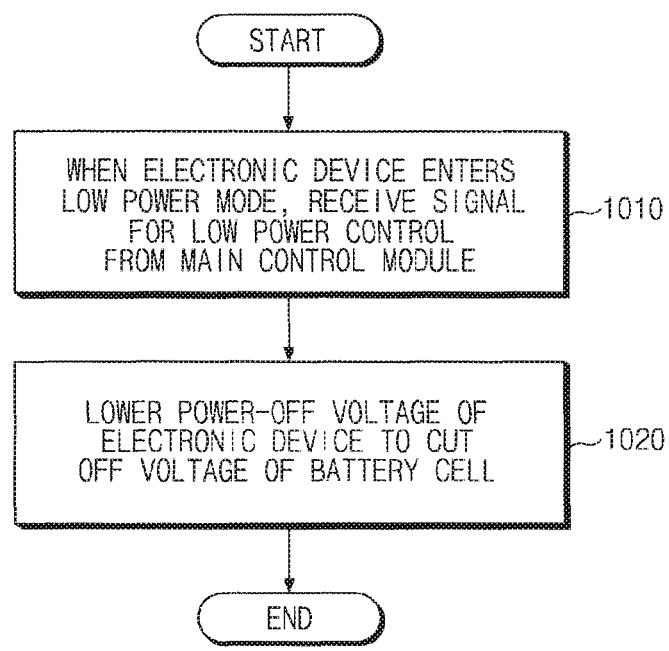
FIG. 10 illustrates a low power driving process according to various embodiments of the present disclosure.

FIG. 10 illustrates a low power driving process according to various embodiments of the present disclosure. The process disclosed in FIG. 10 includes steps processed in the electronic device 100, 200, 300, 400, 500, or 600 shown in FIGS. 1-7. In certain embodiments, even omitted contents, which are described above for the electronic device 100, 200, 300, 400, 500, or 600 shown in FIGS. 1-7, are applied to the process described with reference to FIG. 10.

In step 1010, when the electronic device 100 enters a low power mode, the power management module 430 receives a signal for low power control from the main control module.

In step 1020, the power management module 430 lowers the power-off voltage of the electronic device 100 to the cutoff voltage of a battery cell.

By lowering the power-off voltage of the electronic device 100, the power consumption of the electronic device 100 is reduced.

Figure 11:
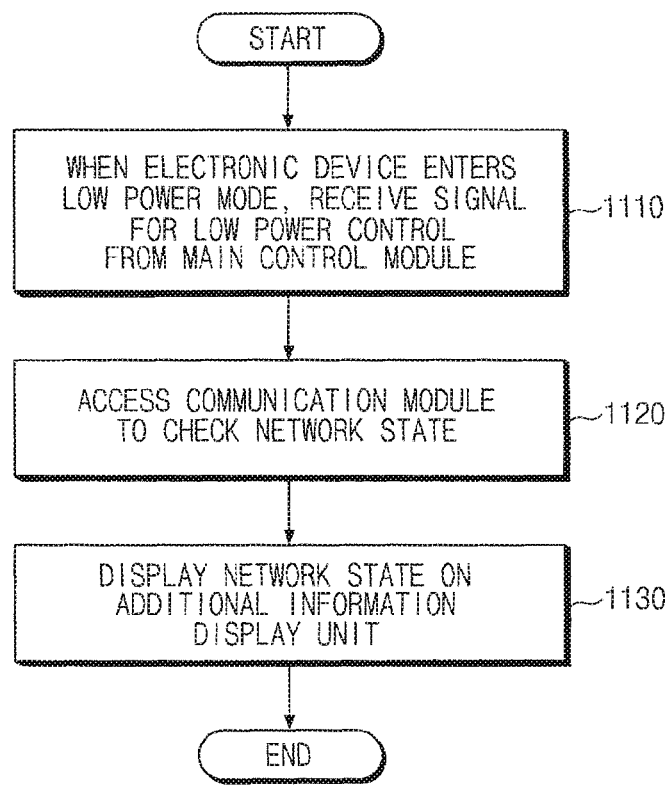
FIG. 11 illustrates a low power driving process according to various embodiments of the present disclosure.

FIG. 11 illustrates a low power driving process according to various embodiments of the present disclosure. The process disclosed in FIG. 11 includes steps processed in the electronic device 100, 200, 300, 400, 500, or 600 shown in FIGS. 1-7. In certain embodiments, even omitted contents, which are described above for the electronic device 100, 200, 300, 400, 500, or 600 shown in FIGS. 1-7, are applied to the process described with reference to FIG. 11.

In step 1110, when the electronic device 100 enters a low power mode, the sub control module 112 receives a signal for low power control from the main control module 111.

In step 1120, the sub control module 112 checks a network state by accessing the communication module 113.

In step 1130, the sub control module 112 displays the network state on the additional information display unit 520.

Since the sub control module 112 displays the network state on the additional information display unit 520, the power consumption of the electronic device 100 is reduced.

Figure 12:
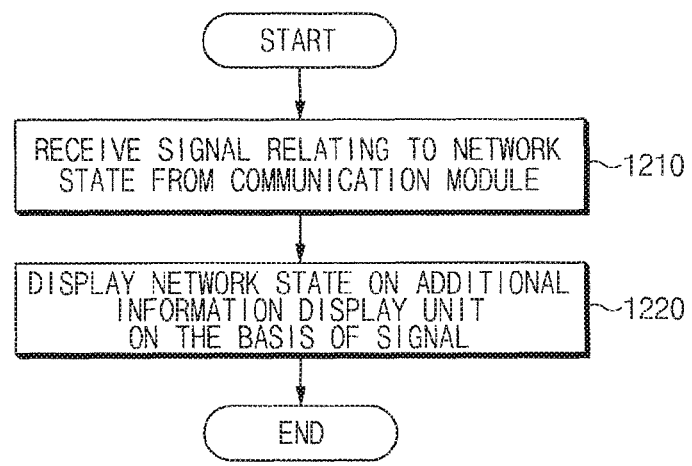
FIG. 12 illustrates a low power driving process according to various embodiments of the present disclosure.

FIG. 12 illustrates a low power driving process according to various embodiments of the present disclosure.

The process disclosed in FIG. 12 includes steps processed in the electronic device 100, 200, 300, 400, 500, or 600 shown in FIGS. 1-7. In certain embodiments, even omitted contents, which are described above for the electronic device 100, 200, 300, 400, 500, or 600 shown in FIGS. 1-7, are applied to the process described with reference to FIG. 12.

In step 1210, the additional information display unit 520 receives a signal relating to network state from the communication module 113.

In step 1220, the additional information display unit 520 displays the network state on the basis of the signal.

The additional information display unit 520 reduces the power consumption of the electronic device 100 by directly receiving a signal relating to a network state from the communication module 113.

As described above, when an electronic device enters a low power mode, its power consumption is reduced. A user uses an electronic device as long as possible in an emergency situation.

Each of the above-mentioned components of the electronic device according to the present disclosure can be configured with at least one component and the name of a corresponding component can vary according to the kind of an electronic device. An electronic device according to the present disclosure can include at least one of the above-mentioned components, cannot include some of the above-mentioned components, or can further include another component. Additionally, some components of an electronic device according to the present disclosure are combined and configured as one entity, so that functions of previous corresponding components are performed identically.

The term "module" used in this disclosure, for example, can mean a unit including a combination of at least one of hardware, software, and firmware. The term "module" and the term "unit", "logic", "logical block", "component", or "circuit" can be interchangeably used. A "module" can be a minimum unit or part of an integrally configured component. A "module" can be a minimum unit performing at least one function or part thereof. A "module" can be implemented mechanically or electronically. For example, a "module" according to various embodiments of the present disclosure can include at least one of an application-specific IC (ASIC) chip performing certain steps, field-programmable gate arrays (FPGAs), or a programmable-logic device, all of which are known or to be developed in the future.

According to various embodiments, at least part of a device (for example, modules or functions thereof) or a method (for example, steps) according to this disclosure, for example, as in a form of a programming module, can be implemented using an instruction stored in non-transitory computer-readable storage media. When at least one processor (for example, the processor 210 executes an instruction, it can perform a function corresponding to the instruction. The non-transitory computer-readable storage media can include the memory 630 of FIG. 6, for example. At least part of a programming module can be implemented (for example, executed) by processor 110, for example. At least part of a programming module can include a module, a program, a routine, sets of instructions, or a process to perform at least one function, for example.

The non-transitory computer-readable storage media can include Magnetic Media such as a hard disk, a floppy disk, and a magnetic tape, Optical Media such as Compact Disc ROM (CD-ROM) and Digital Versatile Disc (DVD), Magneto-Optical Media such as Floptical Disk, and a hardware device especially configured to store and perform a program instruction (for example, a programming module) such as ROM, RAM, and flash memory. Additionally, a program instruction can include high-level language code executable by a computer using an interpreter in addition to machine code created by a complier. The hardware device can be configured to operate as at least one software module to perform a step of this disclosure and vice versa.

A module or a programming module according to the present disclosure can include at least one of the above-mentioned components, cannot include some of the above-mentioned components, or can further include another component. Steps performed by a programming module or other components according to the present disclosure can be executed through a sequential, parallel, repetitive or heuristic method. Additionally, some steps can be executed in a different order or be omitted. Alternatively, other steps can be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A low power driving method for a mobile device comprising:
   storing, by a display driving module, first display data received from a sub control module of the mobile device in a first storage of the mobile device, in a low power mode;
   updating, by the display driving module of the mobile device, at least part of the first display data stored in the first storage to a second storage of the mobile device according to a predefined update method, in the low power mode; and
   displaying, by the display driving module, the at least part of the first display data updated in the second storage on a display device of the mobile device, in the low power mode.

2. The method of claim 1, further comprising:
   storing second display data, which is received from a main control module of the mobile device in real-time, to the second storage, in a normal mode; and
   displaying at least part of the second display data in the second storage on the display device, in the normal mode.

3. The method of claim 1, wherein the predefined update method comprises at least one of an update period and an update amount at one time.

4. The method of claim 1, wherein the first storage is RAM (random access memory) and the second storage is GRAM (graphic RAM).

5. The method of claim 1, further comprising:
   controlling an LED (light emitting diode) to indicate a network state based on a signal relating to the network state which is received from a communication module of the mobile device, in the low power mode.

6. The method of claim 1, further comprising:
   displaying current time on the display device by using an internal clock of the display driving module, in the low power mode.

7. The method of claim 1, further comprising:
   changing a mode of the sub control module from an operating mode into a standby mode after transmitting the first display data to the first storage, in the low power mode.

8. The method of claim 7, further comprising:
   changing, periodically or when a predetermined event occurs, the mode of the sub control module from the standby mode into the operating mode; and
   transmitting, by the sub control module, third display data to the display driving module.

9. The method of claim 8, wherein the predetermined event comprises at least one of a news update, receiving a message, a push notification, or incoming a call.

10. The method of claim 1, further comprising:
    controlling the mobile device to enter the low power mode by transmitting a control signal for driving the sub control module from a main control module to the sub control module.

11. The method of claim 1, further comprising:
    controlling a power-off voltage of the mobile device to a cutoff voltage of a battery cell included the mobile device, in the low power mode.

12. A mobile device comprising:
    a display;
    a sub control module configured to be driven in a low power mode of the mobile device to control the display; and
    a display driving processor configured to:
       store first display data received from the sub control module in a first storage of the mobile device, in the low power mode,
       update at least part of the first display data stored in the first storage to a second storage of the mobile device according to a predefined update method, in the low power mode; and
       display the at least part of the first display data updated in the second storage on a display device of the mobile device, in the low power mode.

13. The mobile device of claim 12, wherein the first storage comprises Random Access Memory (RAM) and the second storage device comprises Graphic Random Access Memory (GRAM).

14. The mobile device of claim 12, wherein the display driving processor is further configured to:
   store second display data, which is received from a main control module of the mobile device in real-time, to the second storage, in a normal mode; and
   display at least part of the second display data in the second storage on the display device, in the normal mode.

15. The mobile device of claim 12, wherein the predefined update method comprises at least one of an update period and an update amount at one time.

16. The mobile device of claim 12, wherein the display driving processor is further configured to:
   control an LED (light emitting diode) to indicate a network state based on a signal relating to the network state that is received from a communication module of the mobile device, in the low power mode.

17. The mobile device of claim 12, wherein the display driving processor is further configured to:
   display current time on the display device by using an internal clock of a display driving module, in the low power mode.

18. The mobile device of claim 17, wherein the display driving processor is further configured to:
   change a mode of the sub control module from an operating mode into a standby mode after transmitting the first display data to the first storage, in the low power mode.

19. The mobile device of claim 18, wherein the display driving processor is further configured to:
   change, periodically or when a predetermined event occurs, the mode of the sub control module from the standby mode into the operating mode; and
   transmit, by the sub control module, third display data to the display driving module.

20. The mobile device of claim 19, wherein the display driving processor is further configured to at least one of:
   control the mobile device to enter the low power mode by transmitting a control signal for driving the sub control module from a main control module to the sub control module; or
   control a power-off voltage of the mobile device to a cutoff voltage of a battery cell included the mobile device, in the low power mode.

* * * * *